(12) United States Patent
Suzuki et al.

(10) Patent No.: US 7,663,537 B2
(45) Date of Patent: Feb. 16, 2010

(54) TARGET DETECTING APPARATUS USING ELECTRONICALLY AGILE RADAR

(75) Inventors: Koichiro Suzuki, Yokohama (JP); Chiharu Yamano, Tokyo (JP); Kazuma Natsume, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/973,363

(22) Filed: Oct. 5, 2007

(65) Prior Publication Data

US 2008/0088498 A1 Apr. 17, 2008

(30) Foreign Application Priority Data

Oct. 12, 2006 (JP) ............................. 2006-278416

(51) Int. Cl.
*G01S 13/06* (2006.01)
*G01S 13/08* (2006.01)
*G01S 13/32* (2006.01)
*G01S 13/93* (2006.01)
*G01S 13/00* (2006.01)

(52) U.S. Cl. .................. 342/133; 342/27; 342/118; 342/127; 342/128; 342/146; 342/147; 342/158; 342/175; 342/195; 342/196; 701/300; 701/301

(58) Field of Classification Search ......... 180/167–169; 701/300, 301; 342/27, 28, 70–72, 104–115, 342/118, 128–133, 145–147, 175, 192–197, 342/127, 158, 165–174
See application file for complete search history.

(56) References Cited

U.S. PATENT DOCUMENTS

| 5,008,678 | A | * | 4/1991 | Herman | 342/70 |
| 5,045,856 | A | * | 9/1991 | Paoletti | 342/70 |
| 5,181,037 | A | * | 1/1993 | Komatsu | 342/70 |
| 5,229,774 | A | * | 7/1993 | Komatsu | 342/70 |
| 5,448,244 | A | * | 9/1995 | Komatsu et al. | 342/147 |
| 5,495,255 | A | * | 2/1996 | Komatsu et al. | 342/175 |
| 5,579,010 | A | * | 11/1996 | Iihoshi et al. | 342/70 |
| 5,598,163 | A | * | 1/1997 | Cornic et al. | 342/70 |
| 5,614,909 | A | * | 3/1997 | Komatsu et al. | 342/70 |
| 5,617,098 | A | * | 4/1997 | Koyanagi et al. | 342/70 |
| 5,652,589 | A | * | 7/1997 | Ono et al. | 342/70 |
| 5,712,640 | A | * | 1/1998 | Andou et al. | 342/70 |

(Continued)

FOREIGN PATENT DOCUMENTS

JP    2000-284044    10/2000

*Primary Examiner*—Bernarr E Gregory
(74) *Attorney, Agent, or Firm*—Harness, Dickey & Pierce, PLC

(57) ABSTRACT

A target detecting apparatus mounted on a vehicle has an electronically agile radar detecting a beat signal indicating a difference in frequency between transmission and reception signals and producing a time series of N reception data from the beat signal, a determining unit determining search areas placed at different ranges of distance from the vehicle while considering a running state of the vehicle and determining a data length for each search area, an extracting unit extracting (N−M+1) time series of short time data, respectively, having the data length corresponding to M reception data from the N reception data for each search area, a producing unit producing phase information from the short time data for each search area, and a detecting unit determining a target distance and a target bearing from the phase information and detecting a target from the target distance and the target bearing.

12 Claims, 15 Drawing Sheets

U.S. PATENT DOCUMENTS

| | | | |
|---|---|---|---|
| 5,717,399 A * | 2/1998 | Urabe et al. | 342/70 |
| 5,896,104 A * | 4/1999 | Komatsu et al. | 342/175 |
| 5,933,109 A * | 8/1999 | Tohya et al. | 342/175 |
| 5,945,939 A * | 8/1999 | Iihoshi | 342/70 |
| 5,949,365 A * | 9/1999 | Wagner | 342/70 |
| 6,008,751 A * | 12/1999 | Kudoh | 342/70 |
| 6,075,479 A * | 6/2000 | Kudoh | 342/70 |
| 6,137,434 A * | 10/2000 | Tohya et al. | 342/70 |
| 6,215,438 B1 * | 4/2001 | Oswald et al. | 342/70 |
| 6,246,357 B1 * | 6/2001 | Uehara | 342/70 |
| 6,246,359 B1 * | 6/2001 | Asano et al. | 342/118 |
| 6,339,395 B1 | 1/2002 | Hazumi et al. | |
| 6,380,884 B1 * | 4/2002 | Satou et al. | 342/70 |
| 6,573,859 B2 * | 6/2003 | Tokoro | 342/70 |
| 6,670,911 B2 * | 12/2003 | Kishida et al. | 342/70 |
| 6,873,251 B2 * | 3/2005 | Schiffmann et al. | 342/118 |
| 6,943,727 B2 * | 9/2005 | Meinecke et al. | 342/192 |
| 7,081,847 B2 * | 7/2006 | Ziller et al. | 342/70 |
| 7,132,976 B2 * | 11/2006 | Shinoda et al. | 342/70 |
| 7,151,482 B2 * | 12/2006 | Natsume et al. | 342/147 |
| 7,173,561 B2 * | 2/2007 | Isaji | 342/70 |

* cited by examiner

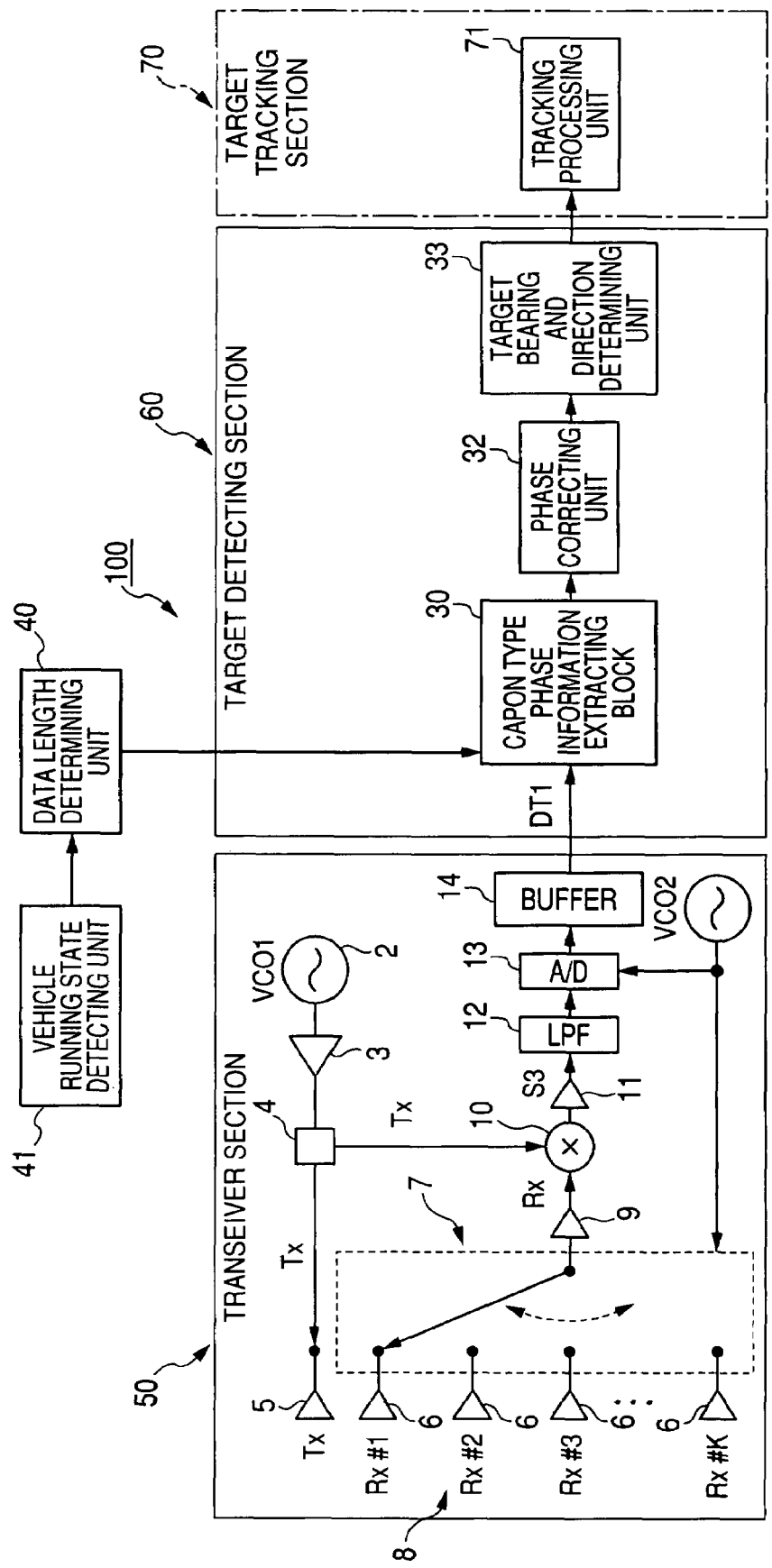

FIG. 8A

| DISTANCE / STATE | L1 | L2 |
|---|---|---|
| HIGHWAY RUNNING STATE | 20m | 40m |
| ORDINARY ROAD RUNNING STATE | 10m | 20m |
| STOPPING STATE | 5m | 10m |

| SEARCH AREA | AR1 | AR2 | AR3 |
|---|---|---|---|
| NUMBER OF RECEPTION DATA | M1 | M2 | M3 |

Tb2

N > M1 > M2 > M3

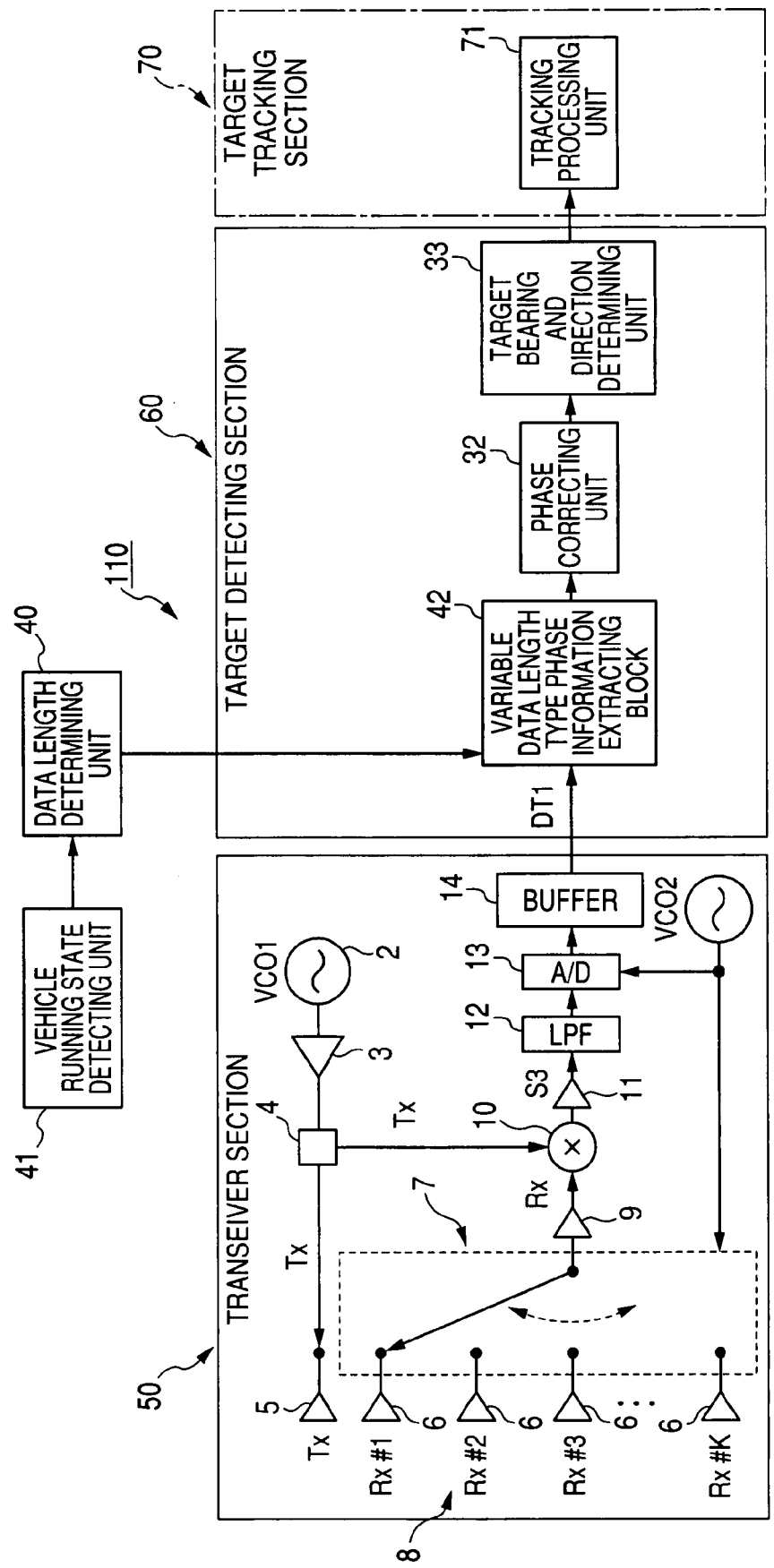

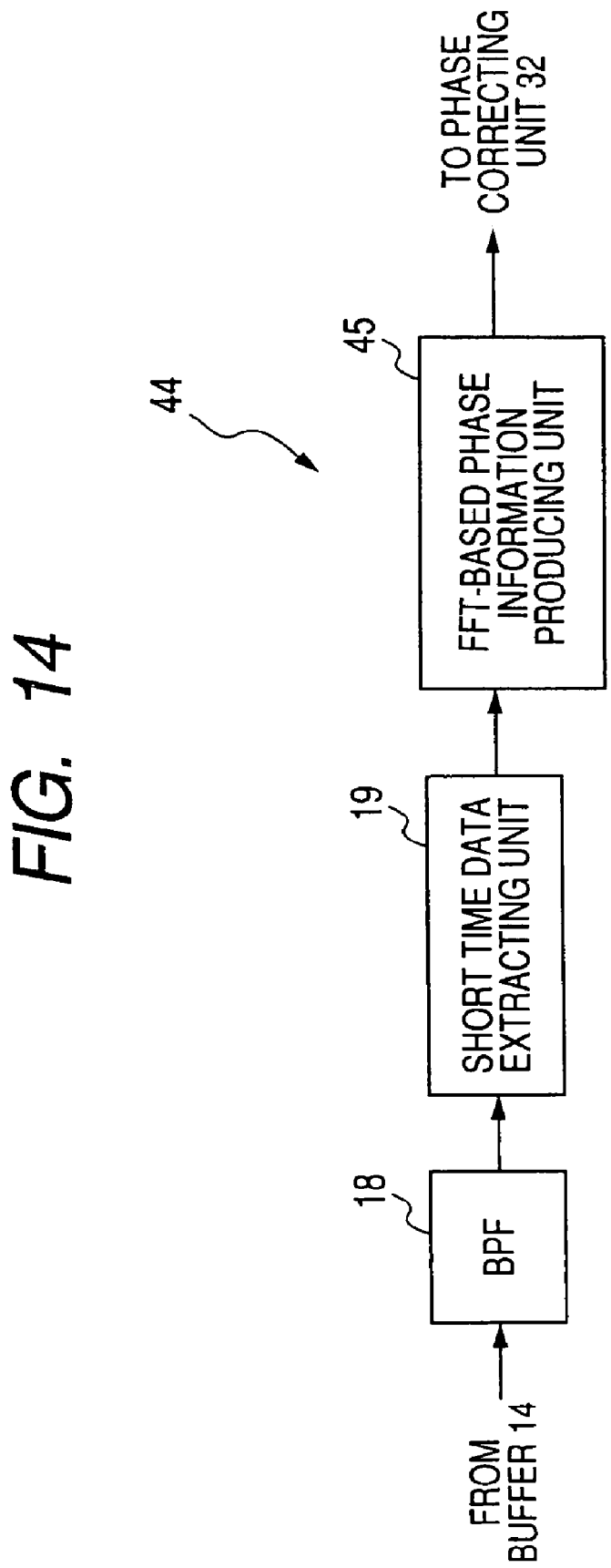

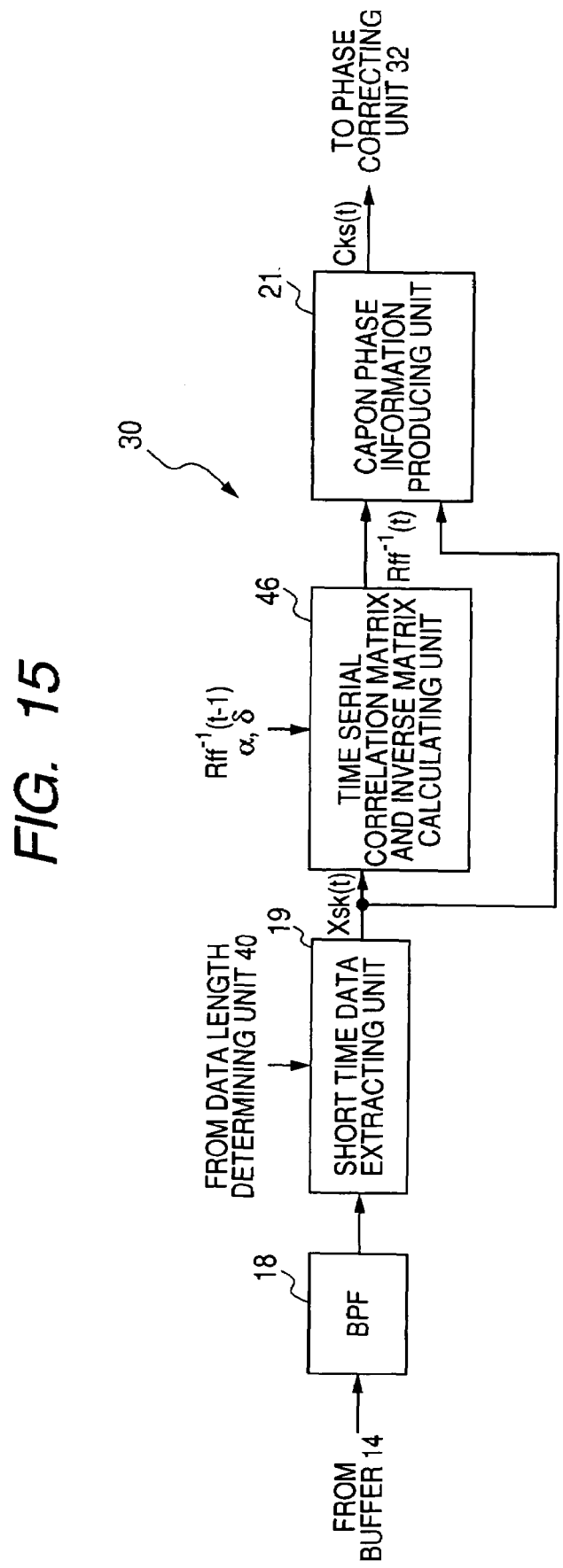

TARGET DETECTING APPARATUS USING ELECTRONICALLY AGILE RADAR

CROSS-REFERENCE TO RELATED APPLICATION

This application is based upon and claims the benefit of priority of the prior Japanese Patent Application 2006-278416 filed on Oct. 12, 2006 so that the contents of which are incorporated herein by reference.

BACKGROUND OF THE INVENTION

1. Field of the Invention

The present invention relates generally to a target detecting apparatus using a frequency-modulated continuous wave (FM-CW) type electronically agile radar mounted on a vehicle, and more particularly to the apparatus for detecting a target placed in front of the vehicle by determining a target position and a target bearing.

2. Description of Related Art

To prevent a vehicle collision or to control a distance between two vehicles, a radar mounted on a present vehicle has been developed. This radar measures a target distance from the present vehicle to a forward target such as a precedent vehicle placed in front of the present vehicle, a relative speed of the present vehicle to the target, and a target bearing (i.e., direction of target or azimuth angle to target).

To measure the target distance and the relative speed, a measurement method using an FM-CW type electronically agile radar has been adopted to simplify a circuit structure of the radar used for the signal processing. This method using the FM-CW radar is described with reference to FIG. 1 and FIG. 2. FIG. 1 is a time chart showing a change in frequency of each of a transmission signal and a reception signal and a time chart showing a change in frequency difference between the signals.

As shown in an upper time chart of FIG. 1, a transmission signal S1 is transmitted from a transmission antenna of an FM-CW type electronically agile radar, and a reception signal S2 obtained by reflecting the signal S1 on a target is received in the radar. A frequency of the signal S1 is constantly increased in an up period and then constantly decreased in a down period. As shown in a lower time chart of FIG. 1, a mixing process is performed for the signals S1 and S2 transmitted and received at the same time to obtain a beat signal S3 having a component which indicates an absolute difference in frequency (i.e., beat frequency Fb) between the signals S1 and S2. When a speed of the present vehicle is the same as that of the target, a frequency of the beat signal in the up period is the same as that in the down period. The beat frequency is proportional to a propagation delay time ΔT equal to a turnaround time of the signal S1 required to go to and return from the target. Therefore, a target distance can be calculated from the beat frequency.

As a technique for measuring a target bearing, an electronically scanning method is known. In this method, scanning processing for all directions from a vehicle can electronically be performed for a short time. That is, transmission waves reflected on a target are received as reception signals in a plurality of antenna elements (array antenna) arranged in a certain rule, and pieces of reception data are obtained from the reception signals. Channels are allocated to the antenna elements, respectively. Among the pieces of reception data of channels, there are time differences (or phase differences). The time differences are determined by a direction of a target from each antenna element, a positional relationship among the antenna elements, and a frequency of the reception signal received in each antenna element. Therefore, a target bearing can be determined from the time differences among the reception data of channels.

For example, a non-patent document ("Adaptive Signal Processing Using Array Antenna", written by Nobuyoshi KIKUMA, published by Science Technology (called Kagaku Gijyutsu in Japan), 1998) discloses a known digital beam forming (DBF) technique. In this DBF, a reception signal is digitized in an analog-to-digital (A/D) converter to obtain a time series of digital data for each channel, a correlation between the time series of digital data and vector data (or mode vector) is calculated for each channel, and a target bearing is determined from the correlations.

Further, to determine this target bearing, it is required to calculate phase information of each channel from the correlation. Differences in phase information of channels denote time differences among the reception data of channels. The phase information of each channel is calculated in a conventional FM-CW type electronically agile radar system shown in FIG. 2 by using the fast Fourier transform (FFT). As shown in FIG. 2, a radar system 200 has a transceiver section 201, a target detecting section 202 and a target tracking section 203. The section 201 transmits a signal S1, receives a signal S2 at many antenna elements to which channels are allocated, mixes the signal S1 and each signal S2 to produce a beat signal S3 for each channel, and produces pieces of reception data from the beat signal S3 for each channel. The beat signal S3 has a component indicating a frequency difference between the signals S1 and S2. The section 202 has an FFT type phase information calculating unit 204, a phase correcting unit 205 and a target bearing determining unit 206. The FFT is performed in the calculating unit 204 to calculate FFT type phase information from the reception data for each channel. The FFT type phase information is corrected in the unit 205, and target information such as a target bearing, a target distance and a relative speed of a target to the radar system is calculated in the unit 206 from differences between the FFT type corrected phase information of the channels. Then, the section 203 controls the radar system 200 on the basis of the target information to lock on the target. For example, Published Japanese Patent First Publication No. 2000-284044 discloses a radar system determining a target bearing according to FFT.

Generally, when a target is placed at a short distance from a present vehicle, target distance precision is more important than that in a target bearing. In contrast, when a target is placed at a long distance from a present vehicle, target bearing precision is more important than that in a target distance. However, when phase information is extracted based on the FFT, there are problems as follows. Precision in the phase information is determined by a spread of a main lobe in the FFT, that is, by both a sampling frequency and the number of sampling points. Therefore, a target placed at a short distance has a lower target distance resolution, or a target placed at a long distance has a lower target bearing resolution. That is, it is difficult to detect a target with a precision appropriately adjusted because of the dependence on a target distance.

An example of the detection of a target on the basis of the FFT is described with reference to FIG. 3A and FIG. 3B. FIG. 3A is a view showing a change in reflection strengths of reception signals on the basis of the FFT, while FIG. 3B is an enlarged view largely showing a change in the reflection strengths shown in FIG. 3A. In this example, a first target B1 is actually placed at a first short distance of about 3.7 m from a present vehicle having an FM-CW type electronically agile radar, and a second target B2 is actually placed at a second short distance of about 5.2 m from the present vehicle. A reception signal S2 is received in five antenna elements 1L, 2L, 3L, 4L and 5L. FFT type phase information is calculated from the signal S2 for each antenna element. A target bearing is determined from differences among the phase information of the antenna elements. A reflection strength of the signal S2 from a coming direction determined by the target bearing is calculated from the FFT type phase information in a searching range of frequency for each antenna element. The frequency in the searching range corresponds to a distance from the vehicle in a searching area.

As shown in FIG. 3A and FIG. 3B, a peak of the reflection strength at a position of the first target B1 overlaps with that at a position of the second target B2. Therefore, the targets B1 and B2 cannot be distinguishably detected. Therefore, when phase information is extracted based on the FFT, a target placed at a short distance cannot be clearly detected at a sufficient resolution.

SUMMARY OF THE INVENTION

An object of the present invention is to provide, with due consideration to the drawbacks of the conventional electronically agile radar, a target detecting apparatus using an electronically agile radar which clearly detects a target while appropriately adjusting a resolution of a target distance and a resolution of a target bearing.

According to an aspect of this invention, the object is achieved by the provision of a target detecting apparatus mounted on a vehicle has a transceiver section producing a beat signal indicating a difference in frequency between a first signal transmitted into a measuring region and a second signal transmitted from the measuring region, a reception data producing unit, a data length determining unit, a short time data extracting unit, a phase information producing unit, and a target detecting unit.

The reception data producing unit produces a time series of N (N is an integer equal to or higher than three) pieces of reception data from the beat signal. The data length determining unit divides the measuring region into a plurality of search areas according to distance from the vehicle, and determines a short time data length for each of the search areas. The short time data extracting unit extracts a plurality of time series of M (M<N) short time data, respectively, having the short time data length from the N reception data for each of the search areas. The phase information producing unit produces phase information from the plurality of time series of M short time data for each of the search areas. The target detecting unit determines a target distance from the vehicle to a target existing in one of the search areas and a target bearing of the target from the vehicle on the basis of the phase information of the search areas and detects the target from the target distance and the target bearing.

With this configuration of the apparatus, the measuring region is divided into the search areas corresponding to different distances from the vehicle. A short time data length is determined for each of the search areas. A plurality of time series of M short time data are produced from one time series of N reception data for each search area. Each time series of M short time data corresponding to one search area has a data length equal to the short time data length corresponding to the search area. Phase information is produced from the plurality of time series of M short time data for each search area. A target distance and a target bearing are determined on the basis of the phase information of the search areas.

In this case, a data volume of each time series of M short time data for one search area differs from those for the other search areas, and the number of time series of M short time data for one search area differs from those for the other search areas. Therefore, a resolution of the target distance and a resolution of the target bearing is adjustably set for each of the search areas.

Accordingly, a resolution of the target distance and a resolution of the target bearing can be appropriately adjusted based on a distance between the vehicle and the target so as to minutely search each of the search areas for a target, and the target exiting in one of the search areas can clearly be detected.

For example, a large short time data length is set for the search area having a short distance from the vehicle to increase the data volume of each time series of M short time data, and a small short time data length is set for the search area having a long distance from the vehicle to increase the number of time series of M short time data. Therefore, when a target is placed near the vehicle, the apparatus can detect the target distance at a high resolution, so that a driver can appropriately prevent the vehicle from colliding with the target. In contrast, when a target is placed far away from the vehicle, the apparatus can detect the target bearing at a high resolution, so that a driver can correctly recognize the target placed in front of the vehicle.

It is preferred that the apparatus further has a vehicle running state detecting unit detecting a running state of the vehicle. The data length determining unit determines a plurality of distance values according to the running state and divides the measuring region at the determined distance values to determine the search areas having different ranges of distance from the vehicle.

With this configuration of the apparatus, the apparatus can determine a range of distance from the vehicle for each search area while considering the running state of the vehicle. Accordingly, a resolution of the target distance and a resolution of the target bearing can be further appropriately adjusted. For example, when the vehicle is stopped, low distance values are determined. In contrast, when the vehicle is run on a highway at a high speed, high distance values are determined. Therefore, a resolution of the target distance and a resolution of the target bearing can automatically adjusted in dependent on the running state, and the vehicle can stably be detected.

BRIEF DESCRIPTION OF THE DRAWINGS

FIG. 4 is a block diagram of a target detecting apparatus using an electronically agile radar according to a first embodiment of the present invention;

FIG. 8A is a view showing an example of a measuring range setting table according to the first embodiment;

FIG. 8B is a view showing an example of a data length table according to the first embodiment;

FIG. 11 is a block diagram of a target detecting apparatus using an electronically agile radar according to a first modification of the first embodiment;

FIG. 14 is a block diagram of an FFT type phase information extracting block shown in FIG. 13; and FIG. 15 is a block diagram of a Capon type phase information extracting block shown in FIG. 4 according to the second embodiment.

DETAILED DESCRIPTION OF THE PREFERRED EMBODIMENTS

Figure 1:
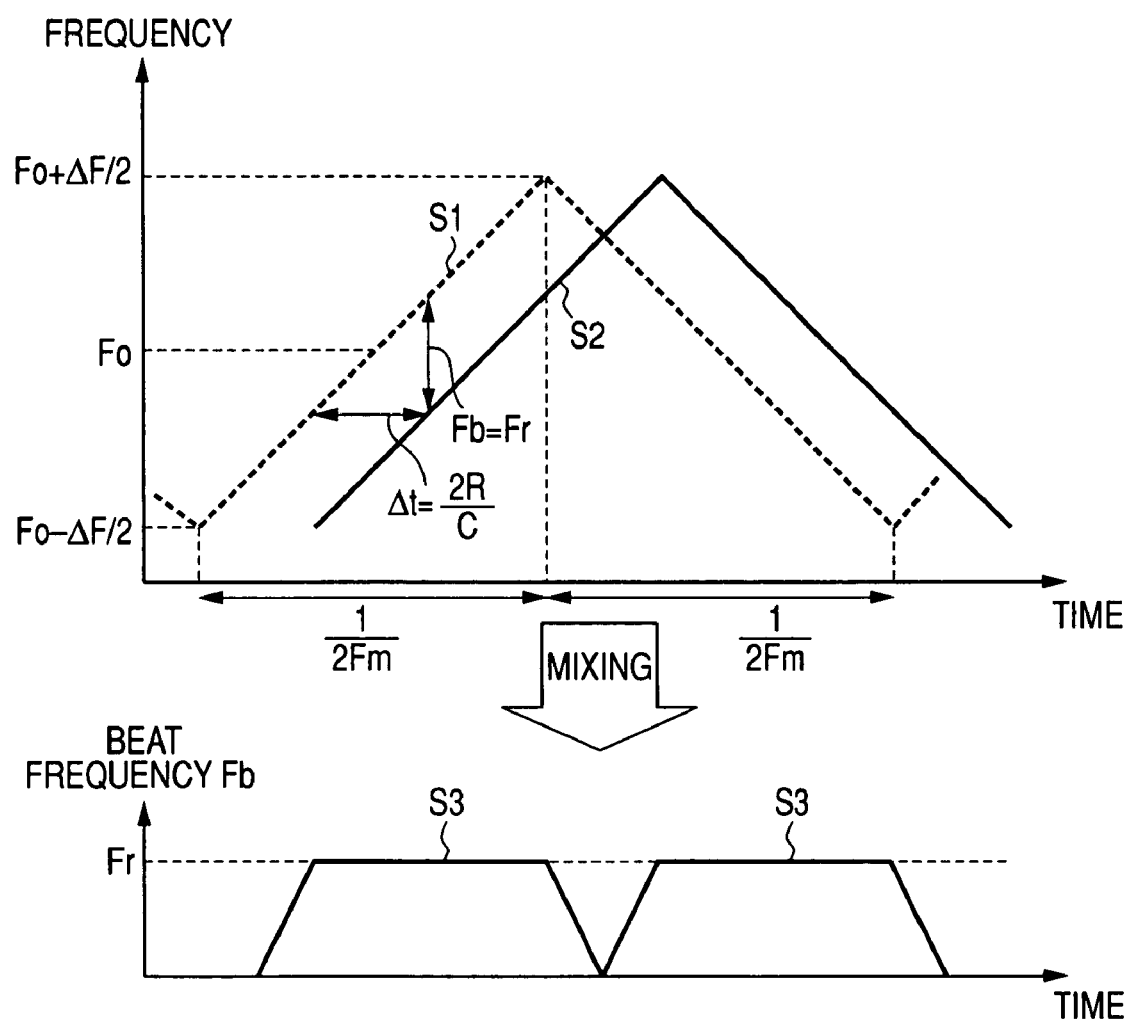
FIG. 1 is a time chart showing a change in frequency of each of a transmission signal and a reception signal and a time chart showing a change in frequency difference between the signals.
Figure 2:
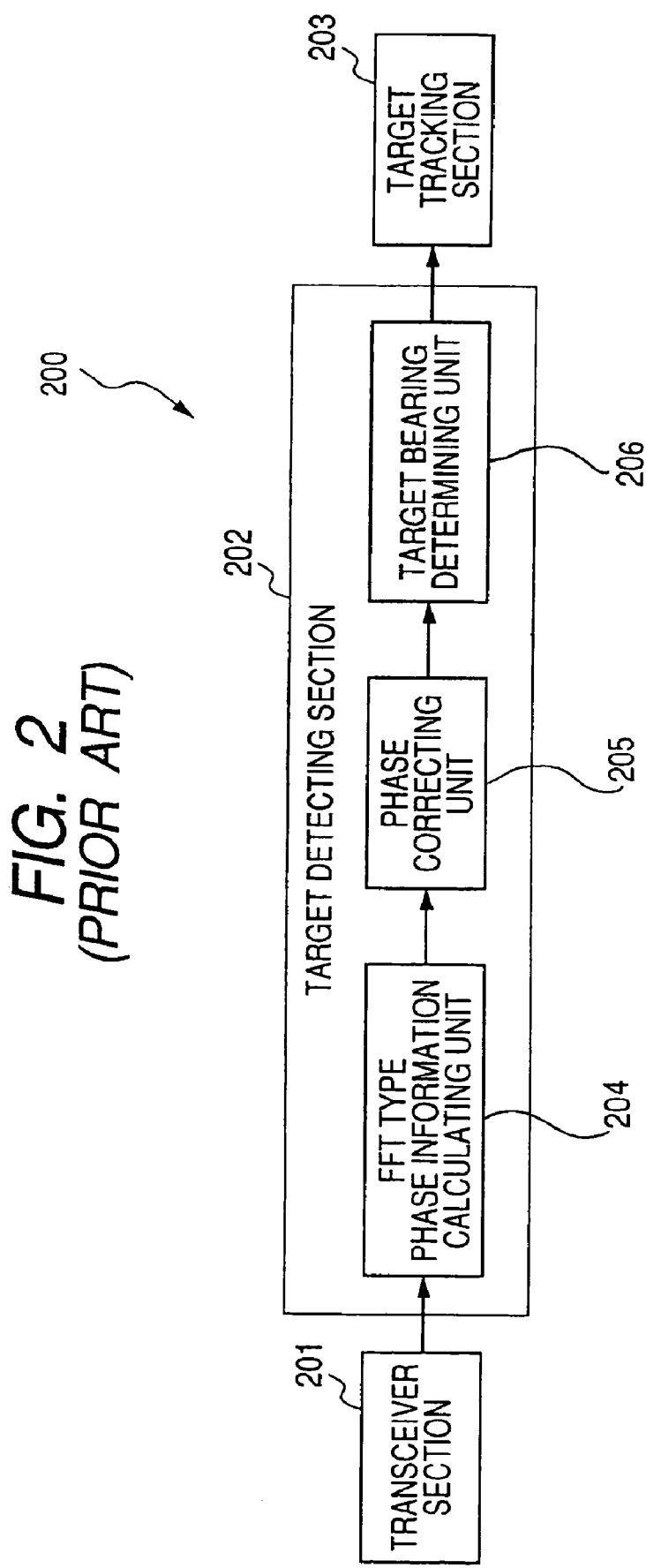
FIG. 2 is a block diagram of a conventional FM-CW type electronically agile radar.

Embodiments of the present invention will now be described with reference to the accompanying drawings, in which like reference numerals indicate like parts, members or elements throughout the specification unless otherwise indicated.

First Embodiment

Figure 5:
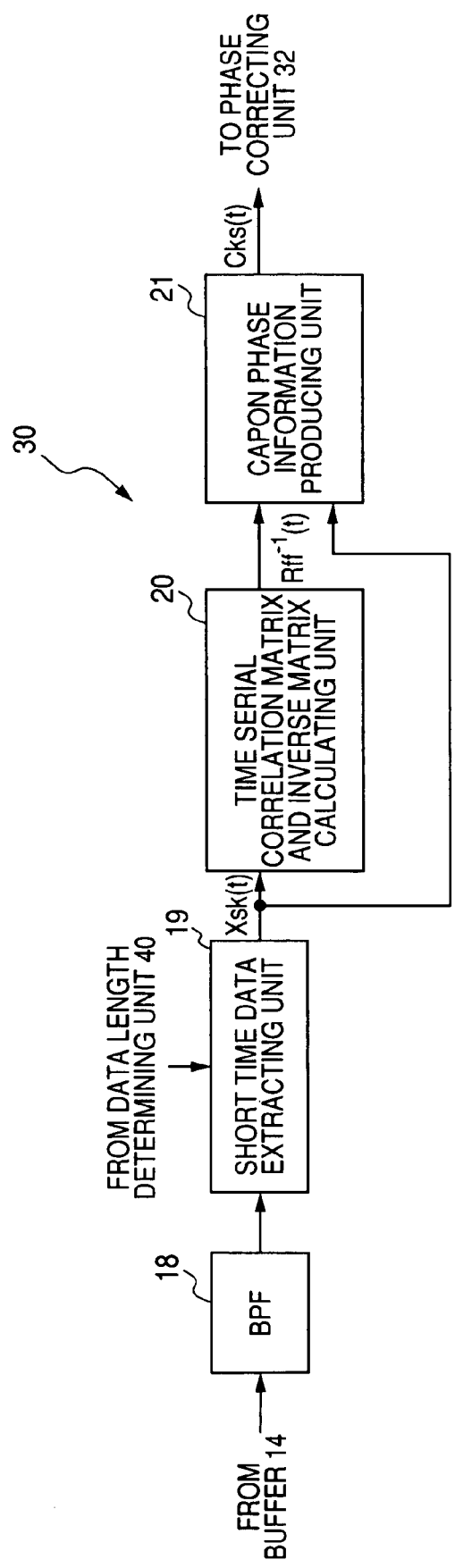
FIG. 5 is a block diagram of a Capon type phase information extracting block shown in FIG. 4.
Figure 6:
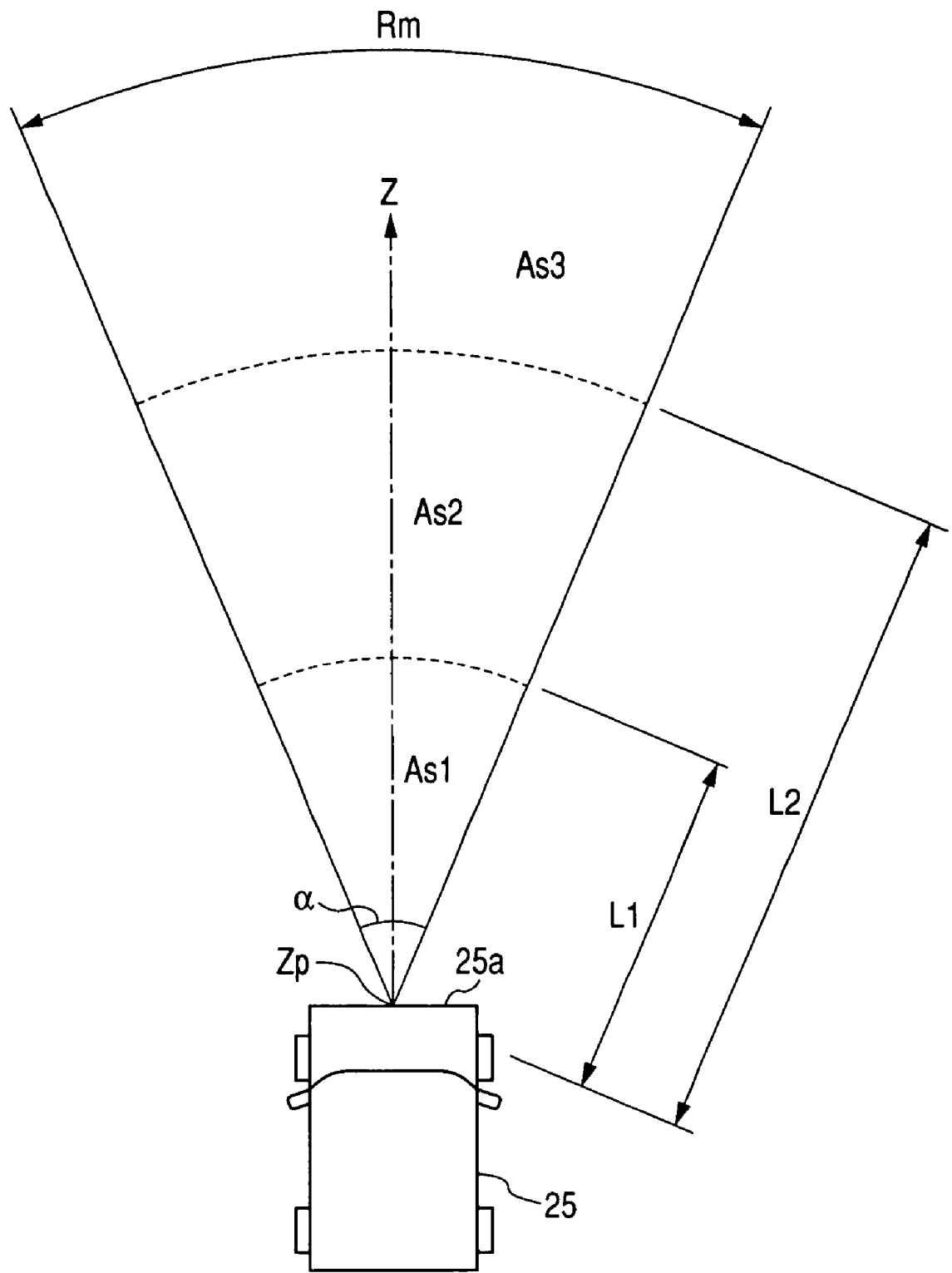
FIG. 6 is a view explanatorily showing three search areas of a fan-shaped measuring region according to the first embodiment.
Figure 7:
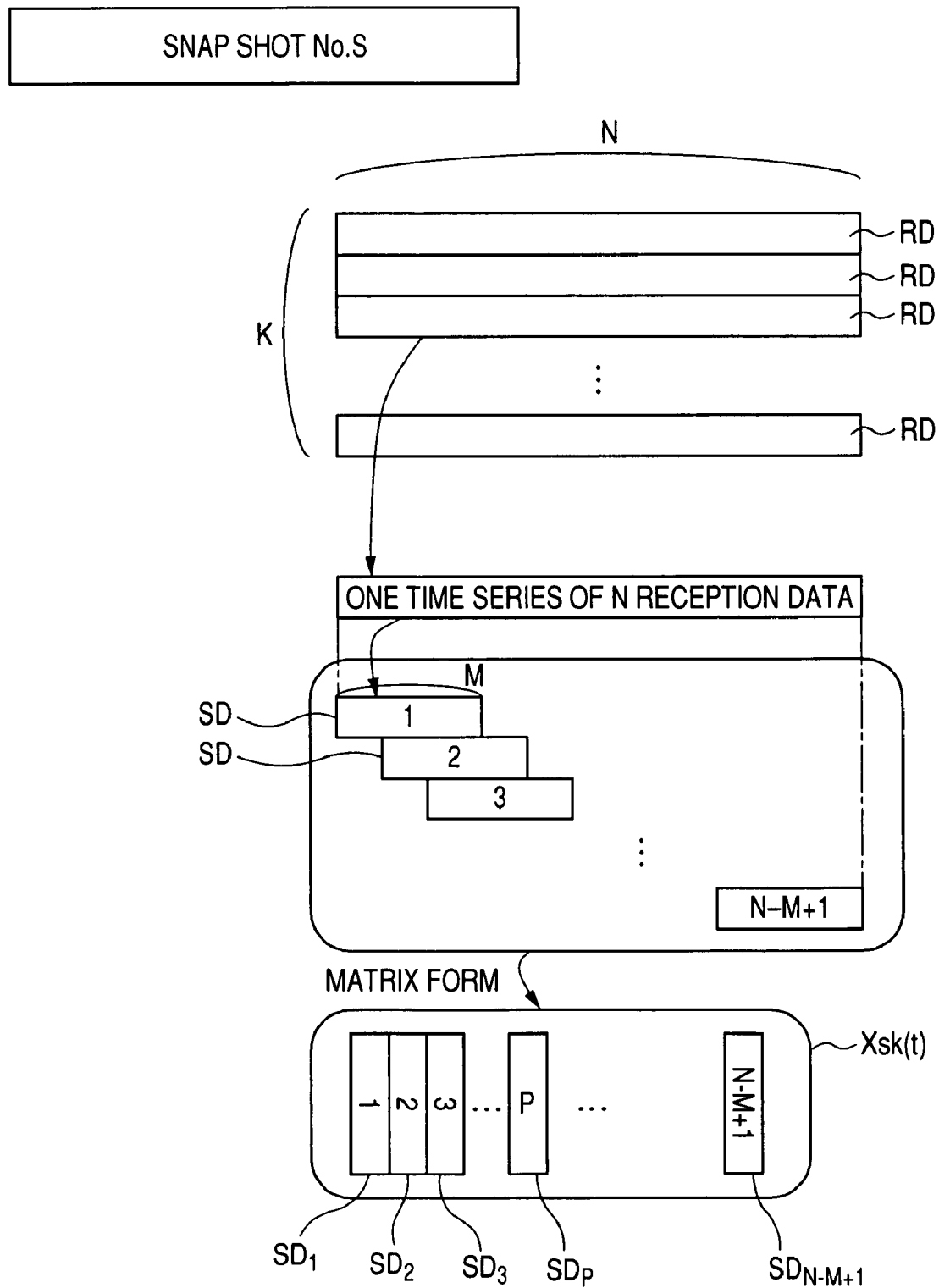
FIG. 7 is a view schematically showing the processing for extracting short time serial data from sampled digital data according to the first embodiment.

FIG. 4 is a block diagram of a target detecting apparatus using an electronically agile radar according to the first embodiment, while FIG. 5 is a block diagram of a Capon type phase information extracting unit shown in FIG. 4. FIG. 6 is a view explanatorily showing three search areas determined by dividing a fan-shaped measuring region placed in front of a present vehicle. FIG. 7 is a view schematically showing the processing for extracting short time serial data from sampled digital data.

An electronically agile radar of a target detecting apparatus 100 shown in FIG. 4 is a type of FM-CW radar for frequency-modulating a continuous wave to obtain a transmission signal Tx having a carrier wave and outputting the signal Tx. The electronically agile radar is also a type of digital beam forming radar for performing the digital beam forming processing for a reception signal Rx received in the radar. A microwave is used as the carrier wave (or radio wave) of the signal Tx. Further, the detecting apparatus 100 is mounted on a head portion of a present vehicle stopped on a parking lot or the like or traveled on a road or the like. The apparatus 100 detects a forward target such as a precedent vehicle placed in front of the present vehicle by measuring a target distance from the apparatus 100 of the present vehicle to the target and a target bearing (i.e., direction of target or azimuth angle to target) from the apparatus 100. The apparatus 100 also measures a relative speed of the present vehicle to the target. An electronic control unit (ECU) of the present vehicle controls the present vehicle on the basis of information (target distance, target bearing, and relative speed) detected in this apparatus 100, so that the present vehicle can be safely traveled without colliding with the target.

As shown in FIG. 4, the detecting apparatus 100 has a transceiver section 50 equivalent to the electronically agile radar, a target detecting section 60, and a target tracking section 70. The section 50 has a first voltage-controlled oscillator (VCO) 2 generating a transmission signal Tx having a modulated wave, an amplifier 3 amplifying the signal Tx, a distributor 4 taking out a portion of the signal Tx, a transmission antenna 5 for radiating a major portion of the signal Tx distributed in the distributor 4 as electromagnetic waves, and a reception array antenna 8. In the VCO 2, a triangular wave modulation is performed for a carrier wave of a frequency Fo at a frequency modulation width $\Delta F$ by using a controlled voltage outputted from a direct current source (not shown) for modulation, so that the modulated wave set at a frequency $F0 \pm \Delta F/2$ is produced as the signal Tx. The antenna 5 has four element antennas (not shown) to have a desired directivity along a horizontal direction.

The antenna 8 has a plurality of array antenna elements 6 of which the number is K. K channels #1, - - -, #k, - - -, and #K (k=1, 2, - - -, K) are allocated to the antenna elements 6, respectively. The antenna elements 6 are aligned along a straight line at equal intervals. Each antenna element 6 has two element antennas (not shown) to have a fixed directivity along a horizontal direction. The antenna elements 6 receive a plurality of reception signals Rx obtained by reflecting the signal Tx on a forward target.

As shown in FIG. 6, a measuring base point Zp is placed on a front surface 25a of a present vehicle 25. The base point Zp is, for example, placed on a center axis of the vehicle 25, and the antennas 5 and 8 are disposed at the base point Zp so as to be placed at the same position along a traveling direction Z (i.e., center axis direction perpendicular to the front surface 25a) of the present vehicle 25. The antenna 5 radiates the signal Tx at a predetermined width of angle $\alpha$ ($0 < \alpha < \pi$ radians) in the traveling direction Z to transmit the signal Tx into a fan-shaped measuring region Rm widened from the base point Zp in front of the vehicle 25. The antenna 8 can receive the signals Rx transmitted from the measuring region Rm.

The section 50 further has a change-over switch 7, a radio frequency (RF) amplifier 9, a mixer 10, an amplifier 11, a low pass filter (LPF) 12, an analog-to-digital (A/D) converter 13, a buffer 14, and a second VCO 15. The VCO 15 outputs a sampling timing signal of a sampling frequency Fs to the converter 13 and outputs a clock signal of a change-over frequency equal to the sampling frequency Fs to the switch 7.

The switch 7 periodically selects the antenna elements 6 one by one in response to the clock signal to connect each selected element 6 to the amplifier 9. The change operation of the switch 7 is electrically performed. The signals Rx received in the antenna elements 6 are multiplexed at a cycle 1/Fsw in time division in the change operation of the switch 7. The switch 7 does not select the antenna elements 6 in the order of arranging the antenna elements 6, but selects in random. For example, when the antenna 8 has five antenna elements 6 corresponding to five channels, the switch 7 selects the antenna elements 6 in the order of $1^{st}$ channel, $3^{rd}$ channel, $4^{th}$ channel, $5^{th}$ channel and $2^{nd}$ channel. In this embodiment, although the time division multiplexing using the switch 7 is performed for the signals Rx received in the antenna elements 6, each of the signals Rx simultaneously received in the antenna elements 6 may be digitized in a corresponding A/D converter.

The amplifier 9 amplifies the time-division multiplexed signal, and the mixer 10 mixes the amplified signal and a portion of the transmission signal Tx sent from the distributor 4. In this mixing, the reception signal Rx is down-converted, and a beat signal S3 shown in the lower chart of FIG. 1 is produced. The beat signal S3 multiplexed has a component indicating a difference in frequency between the transmission signal Tx and the reception signal Rx simultaneously transmitted and received. The processing for producing the beat signal S3 is well known and is, for example, disclosed in Published Japanese Patent First Publication No. H11-133142. Therefore, the detailed description of the processing for producing the beat signal S3 is omitted.

In the triangular wave modulation performed in the transceiver section 50, a target distance R from the present vehicle to the target and a relative speed V of the present vehicle to the target are determined as follows. A beat frequency is expressed by Fr when the relative speed V is equal to zero, and a Doppler frequency based on the relative speed V is expressed by Fd. A beat frequency Fb1 in an up period (i.e., frequency increasing period) and a beat frequency Fb2 in a down period (i.e., frequency decreasing period) are expressed in formulas (1) and (2).

$$Fb1 = Fr - Fd \quad (1)$$

$$Fb2 = Fr + Fd \quad (2)$$

Therefore, when each of the beat frequencies Fb1 and Fb2 is measured, the beat frequency Fr and the Doppler frequency Fd are determined according to formulas (3) and (4).

$$Fr = (Fb1 + Fb2)/2 \quad (3)$$

$$Fd = (Fb2 - Fb1)/2 \quad (4)$$

The target distance R and the relative speed V are calculated from the beat frequency Fr and the Doppler frequency Fd according to equations (5) and (6).

$$R = (C/(4 \times \Delta F \times Fm)) \times Fr \quad (5)$$

$$V = (C/(2 \times F0)) \times Fd \quad (6)$$

The symbol C denotes a light velocity, and the symbol Fm denotes a frequency of the FM modulation.

As described later, a reflection strength of the beat signal S3 corresponding to a coming direction determined from a target bearing is calculated from phase information in a searching range of frequency for each antenna element 6. A beat frequency Fb1 at a peak of the reflection strength in an up period and a beat frequency Fb2 at a peak of the reflection strength in a down period is determined from the reflection strength changing with frequency. A target position and a relative speed is determined from the determined frequencies Fb1 and Fb2 according to formulas (3) to (6).

Thereafter, the beat signal S3 is amplified in the amplifier 11, and high frequent noises of the beat signal S3 are removed in the LPF 12. Then, in the A/D converter 13, a sampling digitization (or quantization) is performed for the beat signal S3 at a sampling frequency Fs of the VCO 15 to obtain a time series of N pieces of reception data DT1 for each of the channels (N is an integer equal to or higher than 3). The N reception data DT1 for each channel indicates a time series of N frequency differences between the signal Tx and the signal Rx received in the antenna element 6 of the channel. The N reception data DT1 for each channel are extracted from the beat signal S3 at sampling time periods 1/Fs. Further, this sampling quantization for obtaining a time series of N reception data for each channel is repeated SSN times (SSN is an integer equal to or higher than 1). Therefore, SSN time series of N reception data are obtained for each channel. The total number of reception data DT1 is equal to K (the number of channels)×N (the number of samples for each channel)×SSN (the number of snap shots). These reception data DT1 are once accumulated in the buffer 14 and are outputted to the target detecting section 60.

A block of N×K pieces of reception data DT1 at a snap shot number s (s=1, 2, - - - , SSN) is expressed by a reception data matrix $X_s(t)$. One piece of reception data DT1 at a sampling number n (n=1, 2, - - - , N) and one channel k (k=1, 2, - - - , K) is expressed by an element $X_s(t)$ [k] [n] of the matrix $X_s(t)$. The matrix $X_s(t)$ is expressed according to a formula (7) by using N×K elements $X_s(t)$ [k] [n].

$$X_s(t) = \begin{bmatrix} x_s(t)[1][1] & \cdots & x_s(t)[1][N] \\ \vdots & \ddots & \vdots \\ x_s(t)[K][1] & \cdots & x_s(t)[K][N] \end{bmatrix} \quad (7)$$

Further, an electronic control unit (ECU) of the present vehicle has a data length determining unit 40 and a vehicle running state detecting unit 41 such as a GPS navigation system, a vehicle speed sensor or the like. The detecting unit 41 detects a vehicle running state on the basis of a vehicle position or a vehicle speed. The determining unit 40 determines a short time data length in response to the vehicle running state detected in the detecting unit 41. The units 40 and 41 are described later in more detail.

The target detecting section 60 has a Capon type phase information extracting block 30, a phase correcting unit 32, and a target bearing and distance determining unit 33. As shown in FIG. 5, the extracting block 30 has a band pass filter (BPF) 18, a short time data extracting unit 19, a time serial correlation matrix and inverse matrix calculating unit 20, and a Capon phase information producing unit 21.

The BPF 18 receives the reception data DT1 of K channels and SSN snap shots from the buffer 14 by extracting data placed in a predetermined frequency range from the buffer 14. As shown in FIG. 7, the extracting unit 19 divides the reception data DT1 into K reception data blocks RD, respectively, corresponding to K channels for each snap shot. Each reception data block RD has one time series of N reception data DT1. Then, when the extracting unit 19 receives information of a short time data length from the determining unit 40, the extracting unit 19 repeatedly extracts or cuts M (M<N) pieces of successively-arranged reception data DT1 having the short time data length from each reception data block RD as a time series of short time data (i.e., short time serial data) SD. In this extraction, the extracting unit 19 shifts a top position of the short time serial data SD to be currently extracted along the time axis by a data length of one piece of reception data from a top position of the short time serial data SD just previously extracted. Therefore, N−M+1 pieces of short time serial data SD are obtained from each reception data block RD. In other words, as a matter of great significance in this embodiment, N−M+1 time series of short time data SD are obtained from one time series of N reception data DT1. The N−M+1 short time serial data SD overlap with one another along the time axis.

More specifically, first short time serial data $SD_1$ denoting one time series of received data $X_s(t)$ [k] [1] to $X_s(t)$ [k] [M], second short time serial data $SD_2$ denoting one time series of received data $X_s(t)$ [k] [2] to $X_s(t)$ [k] [M+1], - - - , p-th (p=1, 2, - - - , N−M+1) short time serial data $SD_p$ denoting one time series of received data $X_s(t)$ [k] [p] to $X_s(t)$ [k] [p+M−1], - - - , and (N−M+1)-th short time serial data $SD_{N-M+1}$ denoting one time series of received data $X_s(t)$ [k] [N−M+1] to $X_s(t)$ [k] [N] are extracted from each reception data block RD for each snap shot. These short time serial data SD of each channel are expressed by a matrix form for each snap shot, and the extracting unit 19 produces a short time data matrix $X_{sk}(t)$ having the N−M+1 short time serial data SD as elements. That is, the extracting unit 19 produces the matrix $X_{sk}(t)$ of each channel from the reception data DT1 outputted from the BPF 18 for each snap shot. The matrix $X_{sk}(t)$ for a channel number k and a snap shot number s is expressed according to a formula (8).

$$X_{sk}(t) = \begin{bmatrix} x_s(t)[k][1] & \cdots & x_s(t)[k][p] & \cdots & x_s(t)[k][N-M+1] \\ x_s(t)[k][2] & \cdots & x_s(t)[k][p+1] & \cdots & x_s(t)[k][N-M+2] \\ \vdots & \ddots & \vdots & \ddots & \\ x_s(t)[k][M] & \cdots & x_s(t)[k][p+M-1] & \cdots & x_s(t)[k][N] \end{bmatrix} \quad (8)$$

The determination of the short time data length in the units 40 and 41 is described in detail with reference to FIG. 6, FIG. 8A and FIG. 8B. FIG. 8A is a view showing an example of a measuring range setting table, while FIG. 8B is a view showing an example of a data length table.

The detecting unit 41 detects that the present vehicle is in a vehicle running state such as a stopping state, an ordinary road running state or a highway running state. For example, a global positioning system (GPS) of an automobile navigation system detects a present position of the vehicle, and the detecting unit 41 judges based on the present position that the vehicle is in a stopping state, in an ordinary road running state or in a highway running state. The detecting unit 41 may detect a vehicle running state from a vehicle running speed such as a stopping state, a state of a low speed, a state of a middle speed or a state of a high speed. For example, a vehicle speed sensor detects a present speed of the vehicle, and the detecting unit 41 judges based on the present speed that the vehicle is in a stopping state, in a running state of the low speed higher than 0 km/hr and equal to or lower than 20 km/hr, in a running state of the middle speed higher than 20 km/hr and equal to or lower than 60 km/hr, or in a running state of the high speed exceeding 60 km/hr. The detecting unit 41 outputs information of the detected vehicle running state to the determining unit 40. The number of running states distinguished in the detecting unit 41 is three or four. However, the detecting unit 41 may detect one state from two types of vehicle running states or may detect one state from five types of vehicle running states or more.

The determining unit 40 determines a plurality of values (L1 and L2 shown in FIG. 6) of distance from the present vehicle according to the running state determined in the unit 41, divides the measuring region Rm into a plurality of search areas (As1, As2 and As3 shown in FIG. 6) at the determined distance values to determine the search areas values having different ranges of distance from the present vehicle, and determines a short time data length for each of the determined search areas. The detecting apparatus 100 searches each search area for a target. The short time data length is equal to a length of M pieces of reception data (M is a changeable integer equal to or higher than 2, and M<N), and the value M is determined for each search area.

As shown in FIG. 6, for example, the determining unit 40 divides the measuring region Rm into three search areas As1, As2 and As3 on the basis of a distance from the vehicle 25. The short distance search area As1 is placed within the distance from 0 to L1 (L1>0), the middle distance search area As2 is placed within the distance from L1 to L2 (L2>L1), and the long distance search area As3 is placed over the distance L2. The determining unit 40 may divide the measuring region Rm into two search areas or four search areas or more. When receiving the stopping state, the ordinary road running state, the low speed running state or the middle speed running state, the determining unit 40 may divide the measuring region Rm into three search areas. When receiving the highway running state or the high speed running state, the determining unit 40 may divide the measuring region Rm into two search areas.

The determining unit 40 has a measuring range setting table Tb1 shown in FIG. 8A and changeably sets the search areas As1, As2 and As3 according to the vehicle running state received from the detecting unit 41 by referring to the table Tb1. As shown in FIG. 8A, in the table Tb1, a first set of distances L1 and L2 is associated with the stopping state, a second set of distances L1 and L2 is associated with the ordinary road running state, and a third set of distances L1 and L2 is associated with the highway running state. For example, the distances L1 and L2 (i.e., 10 m and 20 m) in the second set are set to be longer than those (i.e., 5 m and 10 m) in the first set, and the distances L1 and L2 (i.e., 20 m and 40 m) in the third set are set to be longer than those in the second set. The distances L1 and L2 may be set for each of the stopping state, the low speed running state, the middle speed running state and the high speed running state. Therefore, the determining unit 40 selects one set of distances L1 and L2 in response to the received vehicle running state and sets the search areas As1 to As3 on the basis of the selected set.

The determining unit 40 has a data length table Tb2 shown in FIG. 8B and changeably determines a short time data length for each of the search areas by referring to this table Tb2. As shown in FIG. 8B, in the table Tb2, the search area As1 is associated with a long data length equal to that of M1 pieces of reception data, the search area As2 is associated with an intermediate data length equal to that of M2 pieces of reception data, and the search area As3 is associated with a short data length equal to that of M3 pieces of reception data (N>M1>M2>M3). The extracting unit 19 produces the matrix $X_{sk}(t)$ for each of the search areas, and the matrix $X_{sk}(t)$ in M=M1, the matrix $X_{sk}(t)$ in M=M2, and the matrix $X_{sk}(t)$ in M=M3 are obtained.

The calculating unit 20 calculates a time serial correlation matrix $R_{ff}(t)$ from the matrix $X_{sk}(t)$ for each search area. As is well known, the correlation matrix $R_{ff}(t)$ for the matrix $X_{sk}(t)$ is expressed according to a formula (9).

$$R_{ff}(t) = \frac{1}{SSN \times K \times (N-M+1)} \sum_{S=1}^{SSN} \sum_{k=1}^{K} x_{sk}(t) X_{sk}^{H}(t) \quad (9)$$

$X_{sk}^{H}(t)$ indicates a conjugate and transposed matrix of the matrix $X_{sk}(t)$. Then, the calculating unit 20 assumes or calculates an inverse matrix $R_{ff}^{-1}(t)$ of the matrix $R_{ff}(t)$ from the matrix $R_{ff}(t)$ for each search area.

The Capon phase information producing unit 21 produces a Capon phase information matrix $C_{ks}(t)$ indicating Capon phase information from the matrix $X_{sk}^{H}(t)$ and the matrix $R_{ff}^{-1}(t)$. More specifically, a Fourier-transform vector $a_f$ of an arbitrary frequency f is generally expressed according to a formula (10) by using a variable j (j=1, 2, - - - , N−M+1) and the sampling period of time Ts (=1/Fs) set in the extracting unit 19.

$$a_f = \begin{pmatrix} 1 \\ \vdots \\ \exp(2\pi \times i \times f \times T_s \times (j-1)) \\ \vdots \\ \exp(2\pi \times i \times f \times T_s \times (N-M)) \end{pmatrix} \quad (10)$$

As is well known, a Capon weight $w_f(t)$ for the frequency f at a time t is expressed as a vector according to a formula (11) by using the matrix $R_{ff}^{-1}(t)$, the vector $a_f$ and a conjugate and transposed matrix $a_f^H$ of the vector $a_f$.

$$W_f(t) = \frac{R_{ff}^{-1}(t)a_f}{a_f^H R_{ff}^{-1}(t)a_f} \quad (11)$$

When the reception data should be processed in a range (i.e., range of frequency difference between the signals Tx and Rx) indicated by frequencies f1, f2, - - -, fn in the producing unit 21, a Capon phase extraction matrix W(t) having Capon weights $w_{f1}(t)$ to $w_{fn}(t)$ as elements is expressed according to a formula (12).

$$W(t) = [w_{f1}(t), \ldots, w_{fn}(t)] \quad (12)$$

Therefore, the Capon phase information matrix $C_{ks}(t)$ in the antenna element 6 of one arbitrary channel k in one snap shot s is expressed according to a formula (13).

$$C_{ks}(t) = X_{sk}^H(t)W(t) \quad (13)$$

Figure 9:
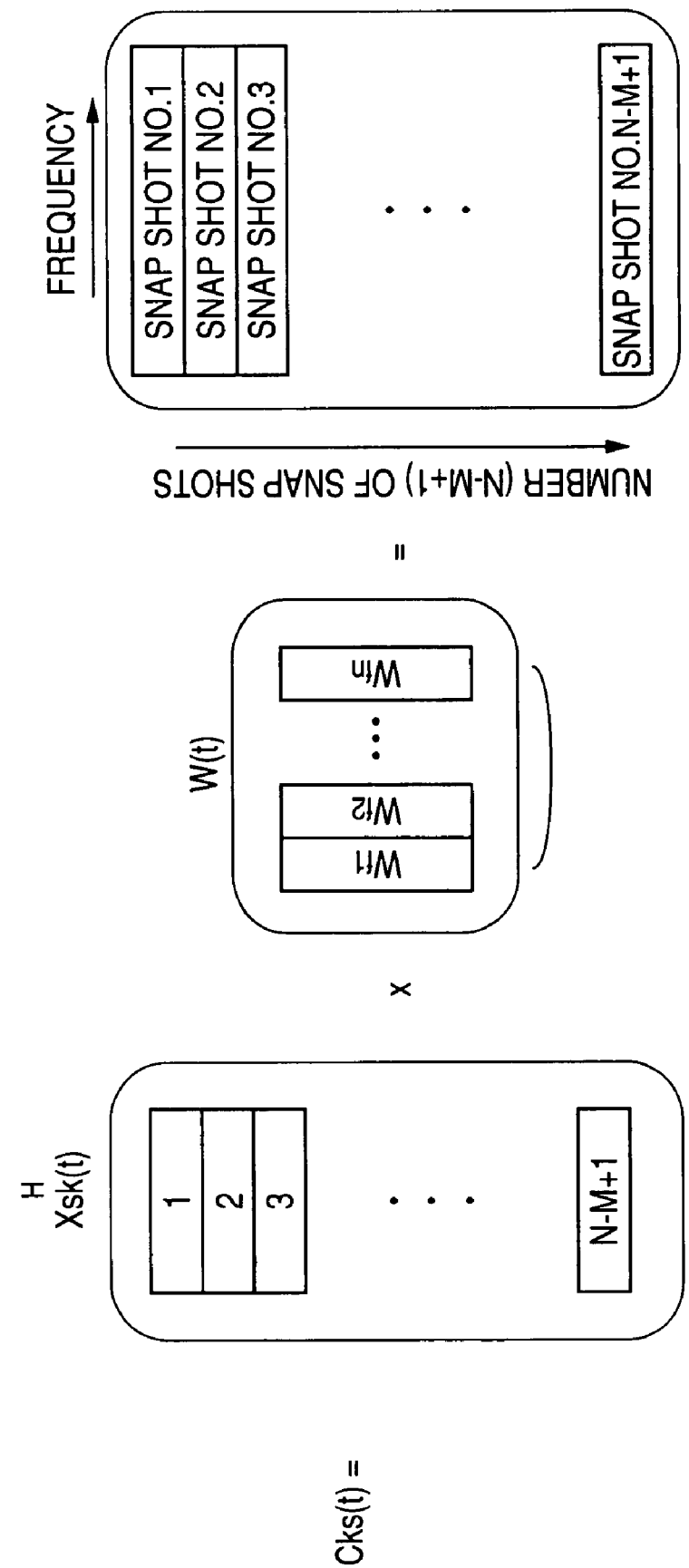
FIG. 9 is a view schematically showing the processing for obtaining Capon type phase information according to the first embodiment.

The matrix $C_{ks}(t)$ obtained as a product of the matrix $X_{sk}^H(t)$ and the matrix w(t) is schematically shown in FIG. 9. FIG. 9 is a view schematically showing the processing for obtaining Capon type phase information. As shown in FIG. 9, (N−M+1) time series of Capon phase information are obtained in one snap shot for each antenna element 6. Because (N−M+1) time series of information are obtained from one series of N reception data DT1, the number of time series obtained substantially becomes (N−M+1) times. In other words, (N−M+1) pieces of short time serial data corresponding to (N−M+1) snap shots can substantially be obtained for each snap shot. Therefore, because the number of original snap shots is equal to SSN, SSN×(N−M+1) pieces of short time serial data in SSN×(N−M+1) snap shots are substantially obtained.

The phase correcting unit 32 corrects the pieces of Capon phase information indicated by the matrixes $C_{ks}(t)$ in the same manner as FFT type phase information is corrected according to a well-known process. The determining unit 33 determines a target bearing from phase differences between the corrected Capon phase information of the channels for each search area. Further, the determining unit 33 calculates a reflection strength of the beat signal S3 from the Capon phase information of the channels in the range of the frequencies f1, f2, - - -, and fn on the basis of the target bearing for each search area and determines a target position and a relative speed from the reflection strength according to formulas (3) to (6).

In response to the target bearing, the target direction and the relative speed, a tracking processing unit 71 of the target tracking section 70 controls the radar of the detecting apparatus 100 to lock on the target. Then, a tracking operation along the time axis is performed for the lock-on target. This tracking operation is well known and is disclosed, for example, in Published Japanese Patent First Publication No. 2003-270341. Therefore, a detailed description of this processing is omitted.

In this embodiment, software programs installed in a microprocessor, a digital data processor or the like are executed to perform the data processing in the target detecting section 60 and the target tracking section 70. However, the data processing in the sections 60 and 70 may be performed in an integrated circuit of a semiconductor device such as a field programmable gate array (FPGA), a large scale integrated circuit (LSI) or the like.

As described above, the determining unit 40 divides the measuring region Rm into the search areas As1 to As3 having different distances from the present vehicle, and determines short time data lengths M (M1, M2, and M3 satisfying the relation M1>M2>M3) for the search areas As1 to As3. For each search area, (N−M+1) time series of short time data SD are extracted from one time series of N pieces of reception data DT1 (M<N) of each channel to produce one short time data matrix Xsk(t) of each channel, the correlation matrix $R_{ff}(t)$ is calculated from each matrix Xsk(t) to calculate or assume the inverse matrix $R_{ff}^{-1}(t)$ of the matrix $R_{ff}(t)$, and the Capon phase information matrix $C_{ks}(t)$ is calculated from the matrix $R_{ff}^{-1}(t)$. Then, the target distance and the target bearing are detected based on the matrixes $C_{ks}(t)$ of the channels and the search areas As1 to As3.

For example, when the detecting apparatus 100 searches a short distance area (i.e., As1 or As2) of the measuring region Rm for a target, it is necessary that a target distance be determined at a high resolution, while a target bearing determined at a comparatively low resolution is allowed. Therefore, the target detecting section 60 determines a long data length corresponding to that of M (i.e., M1 or M2) pieces of reception data, extracts (N−M+1) short time serial data SD, respectively, having a comparatively large data volume, and detects the target from phase information derived from the (N−M+1) short time serial data SD. In this target detection, because the data volume of each piece of short time serial data SD is comparatively large, the target distance can be determined at a higher resolution. In contrast, because the number (N−M+1)×SSN of snap shots is substantially lowered, the target bearing is determined at a comparatively low resolution.

When the radar of the detecting apparatus 100 searches a long distance area (i.e., As3 or As2) of the measuring region Rm for a target, it is necessary that a target bearing be determined at a high resolution, while a target distance determined at a comparatively low resolution is allowed. Therefore, the target detecting section 60 determines a short data length corresponding to that of M (i.e., M3 or M2) pieces of reception data M, extracts (N−M+1) short time serial data SD, respectively, having a comparatively small data volume, and detects the target from phase information derived from the (N−M+1) short time serial data SD. In this target detection, because the data volume of each piece of short time serial data SD is comparatively small, the number (N−M+1)×SSN of snap shots used for the determination of the target bearing can be substantially increased. Therefore, the target bearing can be determined at a higher resolution. In contrast, because the data volume of each piece of short time serial data SD is small, the target distance is determined at a comparatively low resolution.

Accordingly, because the apparatus 100 sets the data volume of each piece of short time serial data SD for each of the search areas while considering a distance of each search area from the present vehicle, a resolution of the target distance and a resolution of the target bearing can be appropriately adjusted so as to minutely search each search area for a target, and the target can be clearly detected.

Further, because (N−M+1) time series of short time data SD are extracted from one time series of N pieces of reception data DT1, the number of snap shots can substantially be increased (N−M+1) times. Accordingly, a resolution of the target bearing can be heightened.

Moreover, the determining unit 40 determines the values L1 and L2 of distance from the present vehicle according to a vehicle running state, and divides the measuring region Rm at the distance values L1 and L2 to determine the search areas As1 to As3 in the measuring region Rm. Accordingly, the apparatus 100 can automatically and appropriately change a short distance area and a long distance area in the measuring region Rm while considering a type of road such as a general road or a highway or a parking lot on which the present vehicle is running or stopped or considering a running speed of the present vehicle. Therefore, phase information appropriate to the running state can be produced to appropriately adjust a resolution of the target distance and a resolution of the target bearing, and the target can appropriately detected. Further, because the apparatus 100 can automatically change a short distance area and a long distance area while considering the detected running state, a driver of the present vehicle is free from the adjustment of the resolutions.

Figure 10A:
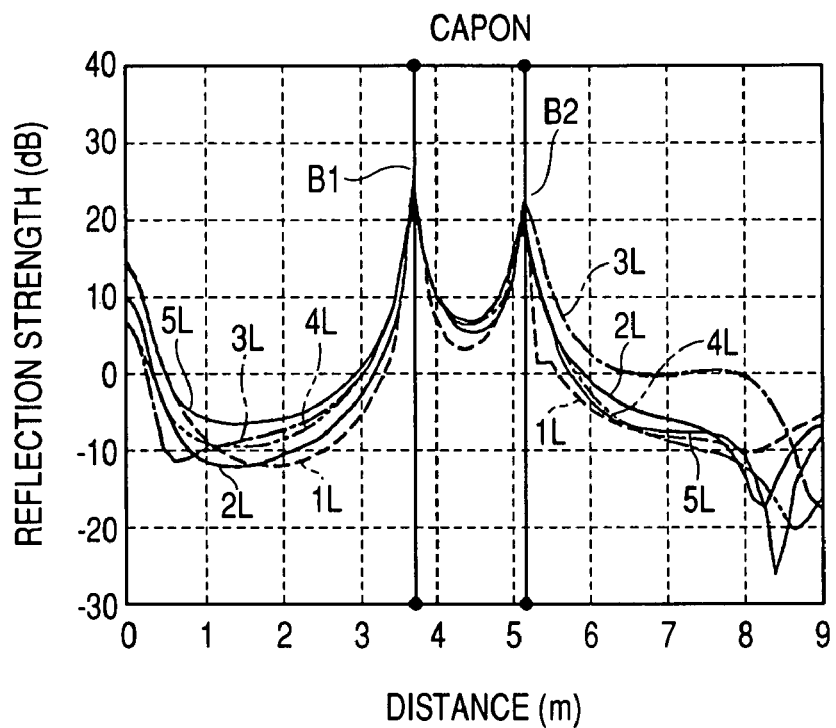
FIG. 10A is a view showing a change in reflection strengths of reception signals according to the first embodiment.
Figure 10B:
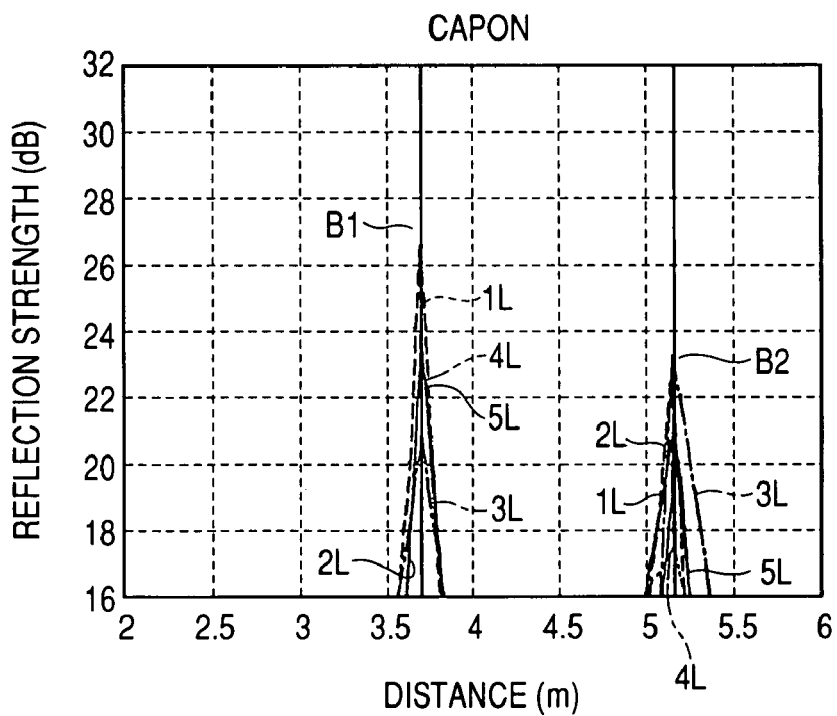
FIG. 10B is an enlarged view largely showing a change in the reflection strengths shown in FIG. 10A.

A result of the detection of a target according to this embodiment is shown in FIG. 10A and FIG. 10B. FIG. 10A is a view showing a change in reflection strengths of reception signals Rx on the basis of Capon phase information indicated by the Capon phase information matrixes $C_{ks}(t)$, while FIG. 10B is an enlarged view largely showing a change in the reflection strengths shown in FIG. 10A. A first target B1 is actually placed at a first short distance of about 3.7 m from the present vehicle, and a second target B2 is actually placed at a second short distance of about 5.2 m from the present vehicle. A reception signal S2 is detected for each of five antenna elements 1L, 2L, 3L, 4L and 5L. Capon phase information each antenna element is obtained from the matrixes $C_{ks}(t)$ for each search area. A reflection strength of the signal Rx from a coming direction determined by the target bearing is calculated from the Capon phase information in a range of the frequencies f1, f2, - - -, and fn for each antenna element. The frequency corresponds to a distance from the vehicle.

Figure 3A:
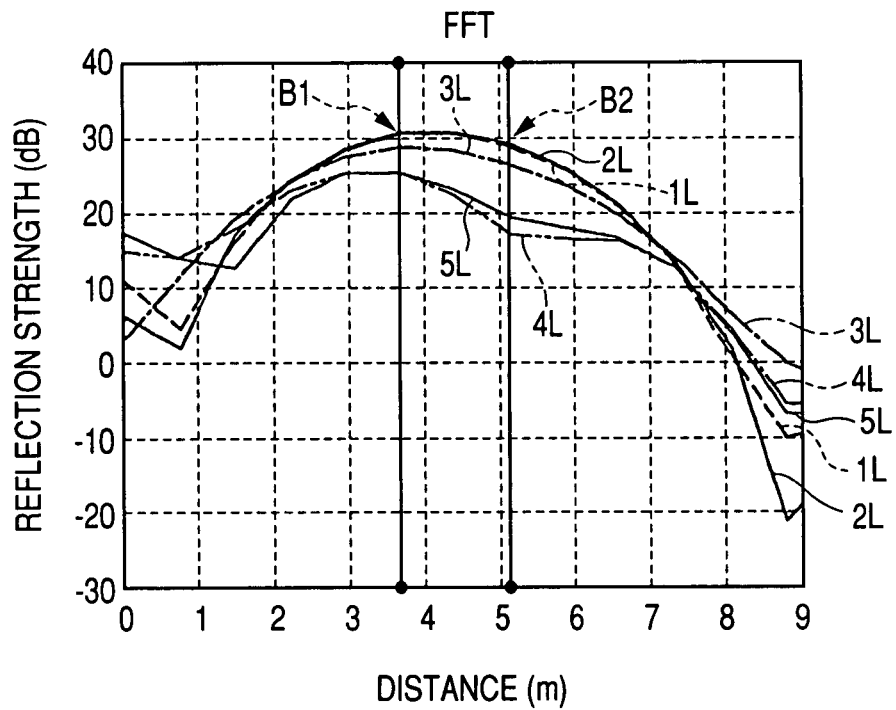
FIG. 3A is a view showing a change in reflection strengths of reception signals on the basis of FFT.
Figure 3B:
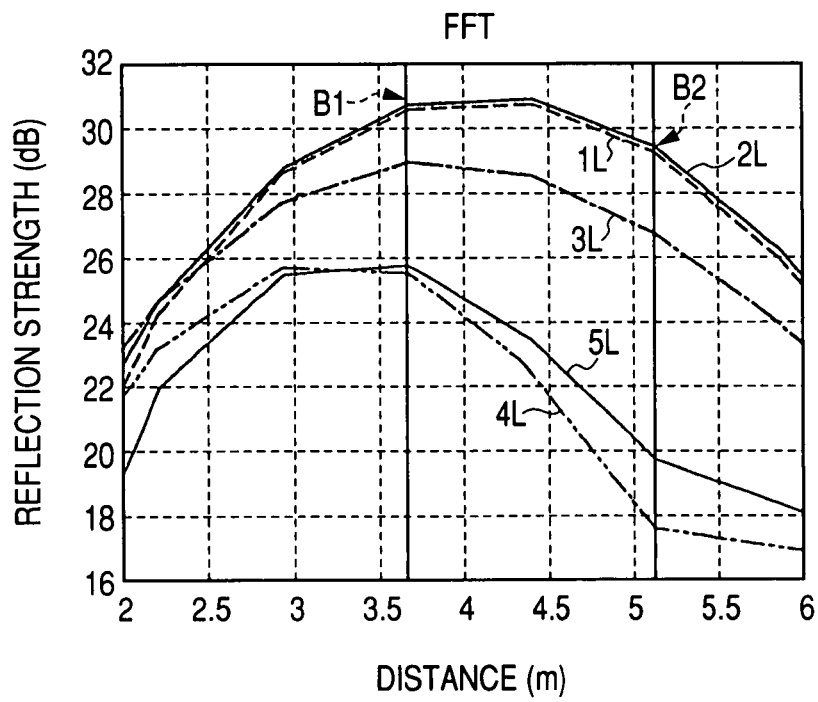
FIG. 3B is an enlarged view largely showing a change in the reflection strengths shown in FIG. 3A.

As shown in FIG. 10A and FIG. 10B, a reflection strength of Capon phase information has a first peak at the position of the first target B1 and has a second peak at the position of the second target B2. This result shows that the resolution of the shorter target distance is heightened as compared with that shown in FIG. 3A and FIG. 3B, and the peaks are clearly distinguished from each other.

Accordingly, because the target distance and the target bearing are calculated from Capon phase information derived from the short time serial data SD and the Capon weights, the targets can be distinguishably detected based on Capon special characteristics with high precision.

In this embodiment, the extracting unit 19 shifts a position of short time serial data SD by a data length of one piece of reception data each time the short time serial data SD is extracted. However, the extracting unit 19 may shift a position of short time serial data SD by a data length of two pieces of reception data or more each time the short time serial data SD is extracted. Further, the extracting unit 19 may arbitrarily extract N−M+1 pieces of short time serial data from each time series of N reception data.

Further, a data length of short time serial data extracted from reception data is changeably adjusted for each search area to change a resolution of a target distance and a resolution of a target bearing on the basis of a distance of the search area from the present vehicle, and Capon phase information indicated by the Capon phase information matrix $C_{ks}(t)$ is used to detect a target. However, on condition that a data length of short time serial data is changeably adjusted for each search area, phase information calculated from the short time serial data according to the fast Fourier transform (FFT) or the like may be used in place of Capon phase information.

First Modification of First Embodiment

Figure 12:
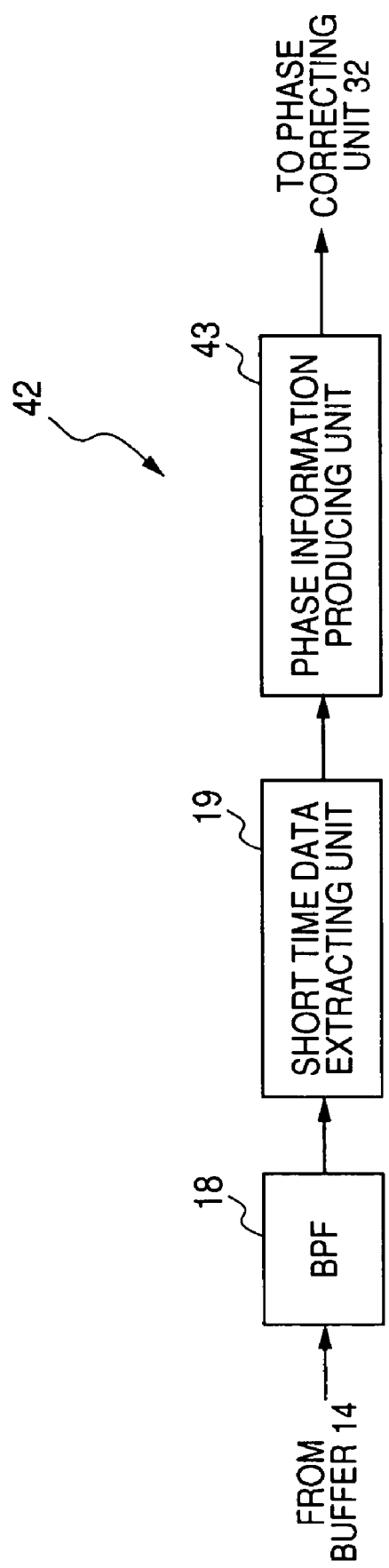
FIG. 12 is a block diagram of a variable data length type phase information extracting block shown in FIG. 11.

FIG. 11 is a block diagram of a target detecting apparatus using an electronically agile radar according to a first modification of the first embodiment, while FIG. 12 is a block diagram of a variable data length type phase information extracting block shown in FIG. 11.

As shown in FIG. 11, a target detecting apparatus 110 differs from the apparatus 100 shown in FIG. 4 in that the apparatus 110 has a variable data length type phase information extracting block 42 in place of the block 30. The extracting block 42 extracts, from the reception data DT, phase information expressed by short time serial data of which a data length is changeably adjusted based on a distance of a search area from the present vehicle.

As shown in FIG. 12, the extracting block 42 has the BPF 18, the extracting unit 19, and a phase information producing unit 43. The producing unit 43 produces phase information from (N−M+1) time series of M short time data of each channel according to an arbitrary transform for each search area every snap shot. The phase information of the unit 43 is processed in the units 32 and 33, and a target is detected while changeably adjusting a resolution of a target distance and a resolution of a target bearing.

Accordingly, the phase information is not limited to the Capon phase information.

Second Modification of First Embodiment

Figure 13:
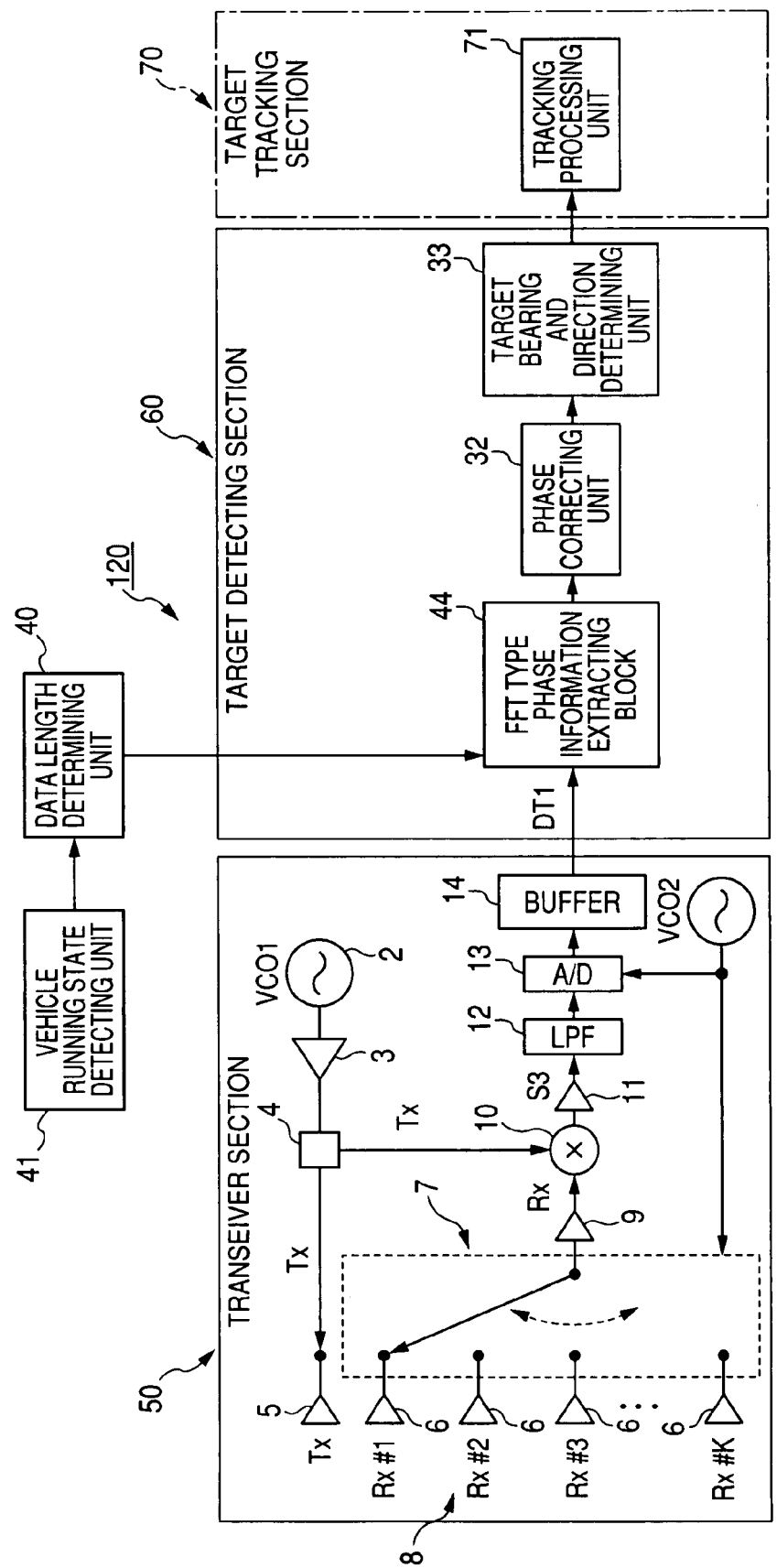
FIG. 13 is a block diagram of a target detecting apparatus using an electronically agile radar according to a second modification of the first embodiment.

FIG. 13 is a block diagram of a target detecting apparatus using an electronically agile radar according to a second modification of the first embodiment, while FIG. 14 is a block diagram of an FFT type phase information extracting block shown in FIG. 13.

As shown in FIG. 13, a target detecting apparatus 120 differs from the apparatus 100 shown in FIG. 4 in that the apparatus 120 has an FFT type phase information extracting block 44 in place of the block 30. The extracting block 44 extracts, from the reception data DT according to the FFT, phase information expressed by short time serial data of which a data length is changeably adjusted based on a distance of a search area from the present vehicle.

As shown in FIG. 14, the extracting block 44 has the BPF 18, the extracting unit 19, and an FFT-based phase information producing unit 45. The producing unit 45 produces FFT type phase information from (N−M+1) time series of M short time data of each channel according to the FFT for each search area. The FFT type phase information of the unit 45 is processed in the units 32 and 33, and a target is detected while changeably adjusting a resolution of a target distance and a resolution of a target bearing.

Accordingly, although precision in the FFT type phase information is inferior to that in the Capon phase information, computational complexity in the production of the FFT type phase information can be reduced.

Second Embodiment

Generally, when an inverse matrix is calculated from a base matrix, not only computational complexity is increased so as to heighten a computational cost, but also the base matrix is required to be a regular matrix. Therefore, to calculate an inverse matrix $R_{ff}^{-1}(t)$ of the correlation matrix $R_{ff}(t)$, it is required to set the short time data matrix $X_{sk}(t)$ to a data size equal to or lower than (N−M+1)×SSN. To avoid this problem in the calculation of an inverse matrix, in this embodiment, the matrix $R_{ff}^{-1}(t)$ is assumed and calculated according to a recursive least square (RLS) method using a matrix $R_{ff}^{-1}(t-1)$ at a previous time.

FIG. 15 is a block diagram of a Capon type phase information extracting block shown in FIG. 4 according to the second embodiment. As shown in FIG. 15, the extracting block 30 has the BPF 18, the extracting unit 19, a time serial correlation matrix and inverse matrix calculating unit 46, and the producing unit 21. The calculating unit 46 assumes or calculates an inverse matrix $R_{ff}^{-1}(t)$ of the matrix $R_{ff}(t)$ for each search area according to serial processing using the RLS method while using the matrixes $X_{sk}(t)$ and $X_{sk}^{H}(t)$, an inverse matrix $R_{ff}^{-1}(t-1)$ at a previous time, a unit matrix I, an oblivion factor α (0<α<1) and a positive constant δ. The calculation of the matrix $R_{ff}^{-1}(t)$ is expressed in a formula (14).

$$\begin{cases} R_{ff}^{-1}(0) = \delta^{-1} I \\ R_{ff}^{-1}(t) = \frac{1}{\alpha} R_{ff}^{-1}(t-1) - \frac{\sum_{S=1}^{SSN} \sum_{k=1}^{K} R_{ff}^{-1}(t-1) X_{sk} X_{sk}^{H} R_{ff}^{-1}(t-1)}{\alpha^2 + \alpha \sum_{S=1}^{SSN} \sum_{k=1}^{K} X_{sk}^{H} R_{ff}^{-1}(t-1) X_{sk}} \end{cases} \quad (14)$$

This calculation is, for example, disclosed in "Adaptive Antenna Technique" written by KIKUMA.

Accordingly, because an inverse matrix $R_{ff}^{-1}(t)$ of the matrix $R_{ff}(t)$ is assumed and calculated according to serial processing using the RLS method, computational complexity in the assumption or calculation of the matrix $R_{ff}^{-1}(t)$ can be reduced. Further, even when the short time data matrix $X_{sk}(t)$ has a large data size, the matrix $R_{ff}^{-1}(t)$ can reliably be obtained.

What is claimed is:

1. A target detecting apparatus for a continuous wave type radar disposed on a vehicle, the apparatus comprising:
    a transceiver section that transmits a first signal into a measuring region, receives a second signal transmitted from the measuring region, and produces a beat signal indicating a difference in frequency between the first and second signals;
    a reception data producing unit that produces a time series of N, which is an integer equal to or higher than three, pieces of reception data from the beat signal;
    a data length determining unit that divides the measuring region into a plurality of search areas according to distance from the vehicle, and determines a time data length for each of the search areas, the time data length for each search area differing from those for the other search areas;
    a time data extracting unit that extracts a plurality of time series of M, which is smaller than N, time data, respectively, having the time data length from the N reception data for each of the search areas;
    a phase information producing unit that produces phase information from the plurality of time series of M time data for each of the search areas; and
    a target detecting unit that determines a target distance from the vehicle to a target existing in one of the search areas and a target bearing of the target from the vehicle on the basis of the phase information of the search areas and detects the target from the target distance and the target bearing.

2. The apparatus according to claim 1, further comprising:
    a vehicle position detecting unit that detects a type of road or a parking lot, on which the vehicle is located, from a position of the vehicle,
    wherein the data length determining unit is adapted to determine a plurality of distance values according to the type of road or the parking lot detected by the vehicle detection unit and to divide the measuring region at the determined distance values to determine the search areas having different ranges of the distance from the vehicle.

3. The apparatus according to claim 2, wherein the vehicle position detecting unit is adapted to detect that the vehicle is running on a general road, running on a highway or is stopped.

4. The apparatus according to claim 1, further comprising:
    a vehicle speed detecting unit that detects a running speed of the vehicle including a stoppage of the vehicle,
    wherein the data length determining unit is adapted to determine a plurality of distance values according to the running speed of the vehicle detected by the vehicle speed detecting unit and to divide the measuring region at the determined distance values to determine the search areas having different ranges of the distance from the vehicle.

5. The apparatus according to claim 1, wherein the phase information producing unit is adapted to transform the plurality of time series of M time data into the phase information according to a fast Fourier transform.

6. The apparatus according to claim 1, wherein the phase information producing unit comprises:
    a time serial correlation matrix and inverse matrix calculating block that calculates a time serial correlation matrix from the plurality of time series of M time data and calculates an inverse matrix of the time serial correlation matrix; and
    a Capon phase information producing block that calculates a Capon weight from the inverse matrix and calculates Capon phase information from the plurality of time series of M time data and the Capon weight.

7. The apparatus according to claim 6, wherein the time serial correlation matrix and inverse matrix calculating block is adapted to assume the inverse matrix at a current time according to a recursive least square method while using the inverse matrix at a previous time.

8. The apparatus according to claim 1, wherein the data length determining unit is adapted to lengthen the data length for one search area placed at a first distance from the vehicle and to shorten the data length for one search area placed at a second distance from the vehicle.

9. The apparatus according to claim 1, wherein the time data extracting unit is adapted to extracts the plurality of time series of M time data from the N reception data while shifting one time series of M time data by a predetermined data length on the N reception data each time the time series of M time data is extracted.

10. The apparatus according to claim 1, wherein the transceiver section comprises:
- a signal transmitting unit that frequency-modulates a continuous wave to obtain the first signal and radiates the first signal into the measuring region;
- a signal receiving unit, having a plurality of receiver elements, respectively, corresponding to a plurality of channels, that receives the second signal coming from the measuring region, in each of the receiver elements; and
- a beat signal producing unit that mixes the first signal and the second signal received in each of the receiver elements to produce the beat signal for each of the channels, wherein the reception data producing unit is adapted to produce the time series of N reception data for each of the channels, the time data extracting unit is adapted to extract the plurality of time series of M time data for each of the channels, the phase information producing unit is adapted to produce the phase information for each of the channels, and the target detecting unit is adapted to detect the target on the basis of the phase information of the channels.

11. The apparatus according to claim 1, wherein the transceiver section comprises:
- a transmission antenna that transmits a first radio wave placed in first radio frequencies as the first signal; and
- a reception antenna that receives a second radio wave placed in second radio frequencies as the second signal.

12. The apparatus according to claim 1, wherein the continuous wave type radar is a frequency-modulated continuous wave type radar.

* * * * *